(12) United States Patent
Betts-LaCroix

(10) Patent No.: US 7,372,454 B2
(45) Date of Patent: May 13, 2008

(54) KEYBOARD WITH VARIABLE-SIZED KEYS

(75) Inventor: Jonathan Betts-LaCroix, Chatsworth, CA (US)

(73) Assignee: OQO Incorporated, San Francisco, CA (US)

( * ) Notice: Subject to any disclaimer, the term of this patent is extended or adjusted under 35 U.S.C. 154(b) by 859 days.

(21) Appl. No.: 10/282,527

(22) Filed: Oct. 29, 2002

(65) Prior Publication Data

US 2003/0080945 A1    May 1, 2003

Related U.S. Application Data

(60) Provisional application No. 60/346,006, filed on Oct. 29, 2001.

(51) Int. Cl.
*G09G 5/00* (2006.01)

(52) U.S. Cl. .................. 345/168; 341/22; 400/485

(58) Field of Classification Search ......... 345/168–172
See application file for complete search history.

(56) References Cited

U.S. PATENT DOCUMENTS

| 1,395,049 | A |   | 10/1921 | McNamara |
|---|---|---|---|---|
| 4,804,279 | A |   | 2/1989 | Berkelmans et al. |
| 5,059,048 | A | * | 10/1991 | Sirkin ................. 400/486 |
| 5,336,001 | A |   | 8/1994 | Lichtenberg |
| 5,487,616 | A |   | 1/1996 | Ichbiah |
| 5,553,953 | A |   | 9/1996 | Herman et al. |
| 5,784,060 | A |   | 7/1998 | Bertram et al. |
| 5,790,103 | A |   | 8/1998 | Willner |
| 5,805,157 | A |   | 9/1998 | Bertram et al. |
| 5,852,414 | A |   | 12/1998 | Yu et al. |
| 5,864,340 | A |   | 1/1999 | Bertram et al. |
| 5,963,671 | A | * | 10/1999 | Comerford et al. ......... 345/168 |
| 6,084,576 | A |   | 7/2000 | Leu et al. |
| 6,231,252 | B1 |   | 5/2001 | Kitamura |
| 6,654,733 | B1 | * | 11/2003 | Goodman et al. ............ 706/11 |
| 2001/0006587 | A1 |   | 7/2001 | Keinonen et al. |
| 2001/0048378 | A1 |   | 12/2001 | Horie |

FOREIGN PATENT DOCUMENTS

DE        3310313 A1    8/1984

(Continued)

OTHER PUBLICATIONS

Thomas Staudter, The Core of Computing: Meta Pad Slices and Dices Pervasive Computing Obstacles, Feb. 7, 2002, 5, www.research.ibm.com/thinkresearch/pages/2002/20020207_metapad.shtml.

(Continued)

*Primary Examiner*—Duc Q Dinh
(74) *Attorney, Agent, or Firm*—Mattingly, Stanger, Malur & Brundidge, PC

(57) ABSTRACT

A computer keyboard is provided having keys that vary in size based on the keys' frequency of use. The keyboard may, for example, be modeled after the standard QWERTY keyboard, but modified such that keys for letters of the most-commonly used letters in the alphabet (such as ETOANIRSH) are larger, and keys corresponding to seldom-used letters (such as YWGBVKXJQZ) are smaller. Such a keyboard may advantageously increase overall ease-of-use and accuracy compared to a keyboard of similar size with constant-sized keys.

13 Claims, 2 Drawing Sheets

FOREIGN PATENT DOCUMENTS

| | | |
|---|---|---|
| WO | WO00/65419 A2 | 11/2000 |
| WO | WO 01/49503 A1 | 7/2001 |

OTHER PUBLICATIONS

John G. Spooner, IBM Plays with Chameleon-like Computer, Feb. 5, 2002, 2, CNET News.com, www.news.com.com/2100-1001-830173.html.

IBM, IBM Research News, IBM Research Demonstrates 9-Ounce Prototype Portable Computer to Explore Future Devices, 2, www.research.ibm.com/resources/news/20020206_metapad.shtml.

Bell, D.A., "Information Theory and its Engineering Applications", 1953, 137 Pgs., Sir Isacc Pitman & Sons, Ltd., Pitman House, London, England.

* cited by examiner

KEYBOARD WITH VARIABLE-SIZED KEYS

CROSS REFERENCE TO RELATED APPLICATIONS

This application claims priority from U.S. Provisional Patent Application Ser. No. 60/346,006, filed on Oct. 29, 2001, entitled "Keyboard With Variable-Sized Keys," which is hereby incorporated by reference; and from PCT Application No. PCT/US02/32393, filed on Oct. 10, 2002, entitled "Keyboard with Variable-Sized Keys," which is hereby incorporated by reference.

BACKGROUND

1. Field of the Invention

The present invention relates to computer input devices and, more particularly, to keyboards for providing input to computing devices.

2. Related Art

Most computing devices use a keyboard or keypad for providing alphanumeric and other input to the computing device. For example, most conventional desktop and laptop computers employ a keyboard including both alphanumeric keys for providing alphanumeric input to the computer and a variety of function keys for issuing commands to the computer. The layout of the alphanumeric keys on such keyboards is typically based on the standard employed by conventional manual typewriters. In particular, the alphabetic keys are arranged in what is commonly referred to as a QWERTY layout because the upper row of alphabetic keys begins with the letters Q, W, E, R, T, and Y.

One advantage of using the QWERTY layout to arrange keys on a computer keyboard is that large numbers of users are already familiar with the QWERTY layout. Typists have been trained for many years to touch-type using keyboards having the QWERTY layout (referred to herein simply as "QWERTY keyboards"), resulting in a large base of users who are skilled at typing relatively quickly and accurately using QWERTY keyboards. Organizations and individuals have invested significant resources in developing the skills necessary to type proficiently using QWERTY keyboards. As a result, a new computing device having a QWERTY keyboard is likely to meet with more acceptance and to require less training than a computing device with a keyboard having a different layout.

There are, however, problems with the QWERTY layout. It can be difficult for novice typists to learn how to type using QWERTY keyboards, at least in part because the keys in the QWERTY layout are not arranged alphabetically. Although it is possible to learn to touch-type relatively quickly and accurately using a QWERTY keyboard, doing so can take a significant amount of training and require significant ongoing practice in order to maintain high levels of speed and accuracy.

Furthermore, some frequently-used keys are so located in the QWERTY layout as to require movement of the fingers to reach them, while some less-frequently used keys are so located as to be easily reached. As a result, typing using a QWERTY keyboard may result in typing speeds and error rates that are less than optimal.

Conventional computer keyboards compound these problems by introducing large numbers of additional keys, such as function keys, numeric data entry keys, and cursor positioning keys. The total number of keys on a conventional computer keyboard typically exceeds one hundred. The difficulty of remembering the precise location of each key on such a keyboard, in combination with the amount of finger movement required to type on such a keyboard, can further reduce typing speed and accuracy. When using such keyboards, even trained touch typists may mistype individual keys on occasion, particularly when typing keys that are dispersed throughout the keyboard. Users who type using the "hunt and peck" method may also mistype keys for a variety of reasons, such as poor hand-eye coordination or out of an attempt to type too quickly.

Various attempts have been made to devise improved keyboards to increase typing speeds and/or decrease typing error rates. For example, some keyboards use layouts other than the QWERTY layout. Some of these alternative layouts are designed to place the most frequently-used keys directly underneath the user's fingers so that it is not necessary to move the fingers in order to reach such keys. Some layouts place the most-frequently used keys directly underneath or near the user's strongest fingers, such as the index and pointer fingers, and the less-frequently used keys directly underneath or near the user's weakest fingers, such as the ring finger.

Other alternative keyboards assign multiple characters to individual keys on the keyboard, thereby reducing the total number of keys on the keyboard and correspondingly reducing the number of fingers that are required to type and/or the amount of finger motion used while typing. The goal of such alternative keyboard layouts is to increase typing speed and/or reduce typing error rates. With some keyboards, a particular character is input by pressing a particular key in a particular way (such as by pressing the key at one corner to input one character and at another corner to input a different character), or by repeatedly pressing a particular key a different number of times in order to specify different characters. Some schemes employ algorithms to predict which character the user desires to input based on various factors.

All of the alternative layouts described above have the disadvantage that they do not retain the QWERTY layout to which so many users have become accustomed. Any potential increase in speed or reduction in error rate that may be attained as a result of such alternative layouts must be weighed against the costs associated with retraining users who have become accustomed to and adept at using the QWERTY layout. In fact, none of the alternative keyboard layouts described above has met with significant success, at least in part as a result of the extremely deep penetration of the QWERTY layout and its widespread acceptance.

What is needed, therefore, is an improved keyboard that increases typing speed and/or reduces typing error rates, and that is compatible with the QWERTY keyboard layout.

SUMMARY

In one aspect, the present invention features a computer keyboard whose keys vary in size based on the keys' frequency of use. The keyboard may, for example, be modeled after the standard QWERTY keyboard, but modified such that keys for letters of the most-commonly used letters in the alphabet (such as ETOANIRSH) are larger, and keys corresponding to seldom-used letters (such as YWG-BVKXJQZ) are smaller. For example, referring to FIG. 1, an example of a keyboard 100 in which frequently-used keys (such as E, R, and T) are larger than infrequently-used keys (such as Z, X, and Q). Such a keyboard may advantageously increase overall ease-of-use and accuracy compared to a keyboard of similar size with constant-sized keys.

Other features and advantages of various aspects and embodiments of the present invention will become apparent from the following description and from the claims.

DETAILED DESCRIPTION

In one aspect, the present invention features a computer keyboard whose keys vary in size based on the keys' frequency of use. The keyboard may, for example, be modeled after the standard QWERTY keyboard, but modified such that keys for letters of the most-commonly used letters in the alphabet (such as ETOANIRSH) are larger, and keys corresponding to seldom-used letters (such as YWGBVKXJQZ) are smaller. For example, referring to FIG. 1, an example of a keyboard 100 in which frequently-used keys (such as E, R, and T) are larger than infrequently-used keys (such as Z, X, and Q). Such a keyboard may advantageously increase overall ease-of-use and accuracy compared to a keyboard of similar size with constant-sized keys.

Key size may, for example, be a monotonic function of key frequency of use. There may be any number of different key sizes. For example, the size of individual keys may vary based on their frequency of use. Alternatively, there may be a predetermined number of key sizes, and one of the predetermined key sizes may be assigned to each key based on the key's, frequency of use. The sizes of all of the keys on the keyboard, or only a subset thereof, may vary based on frequency of use. For example, in one embodiment, only the sizes of alphanumeric keys vary based on their frequencies of use. The remaining (non-alphanumeric) keys may, for example, have the same shapes and/or sizes as corresponding keys on a conventional computer keyboard.

More generally, in one aspect of the invention, a keyboard is provided that includes a first plurality of N keys, referred to herein as K, wherein K(n) refers to the nth key on the keyboard and wherein n ranges from 1 to N. The keys have a plurality of M sizes, referred to herein as S, wherein S(m) refers to the mth size, wherein m is an integer ranging from 1 to M, and wherein $1 < M \leq N$. In other words, each key may have a distinct size, or there may be a plurality of key sizes, wherein each of the key sizes specifies the size of at least one of the keys on the keyboard.

The keys have a plurality of I frequencies of use, referred to herein as F, wherein F(i) refers to the ith frequency of use, wherein i ranges from 1 to I, and wherein $1 < I \leq N$. For example, the number of keys N may be equal to the number of frequencies of use I, in which case each of the keys K(n) may have a distinct frequency of use F(i), where n=i. Alternatively, there may be fewer frequencies of use than keys on the keyboard.

Figure 2:
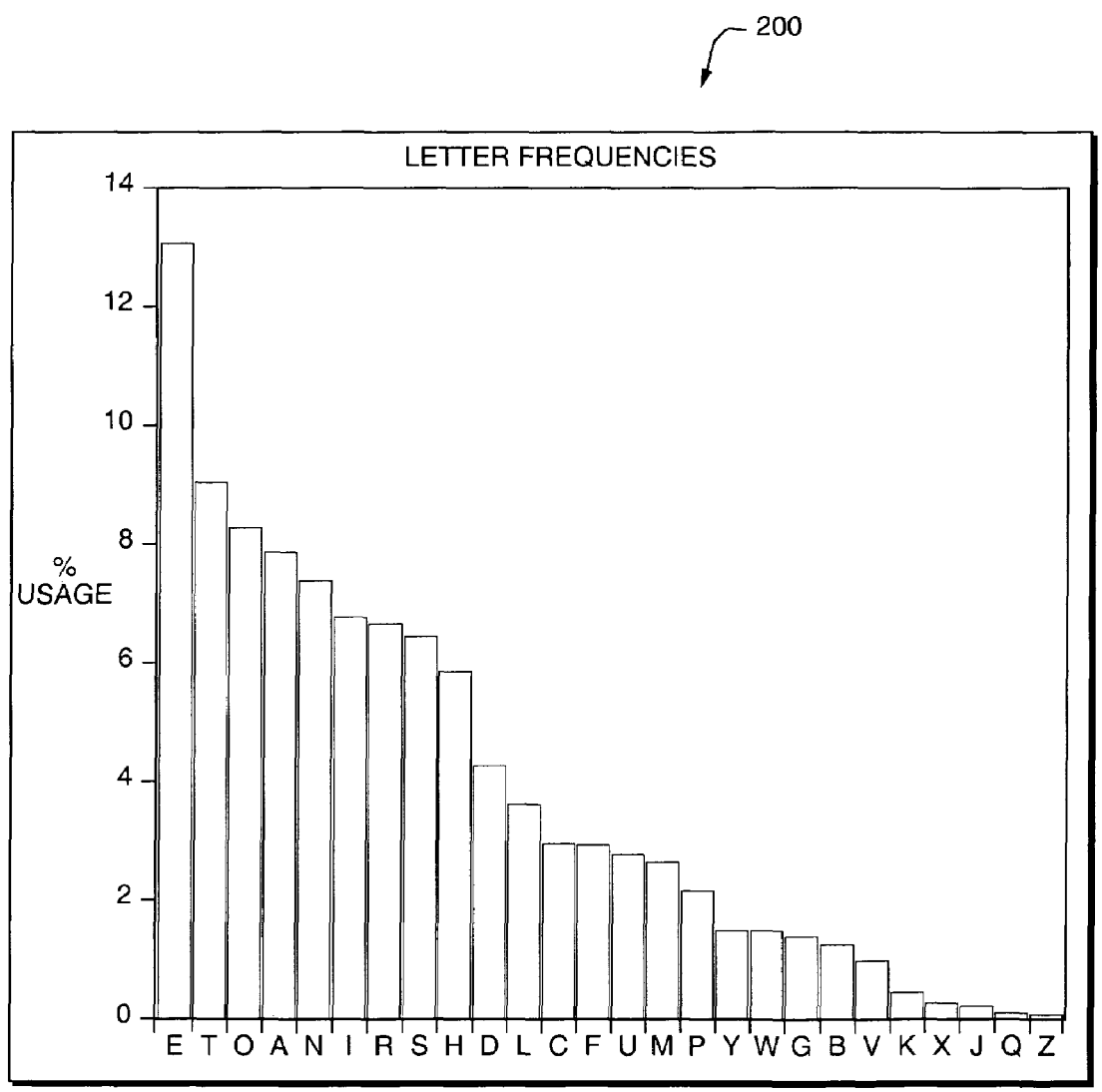
FIG. 2 is a chart of letter frequencies that may be used to select sizes of keys on a keyboard according to various embodiments of the present invention.

For example, Table 1 shows frequencies of use of letters in the English language, obtained from *Information Theory*, by D. A. Bell, Sir Isaac Pitman & Sons Ltd., London (1953). These letter frequencies may, for example, be used as the frequencies of use F and therefore as the basis for the key sizes S. For example, F(1) may refer to the frequency of use of the letter E (13.5%), F(2) may refer to the frequency of use of the letter T (9.02%), and so on. Referring to FIG. 2, a chart 200 graphically illustrates the letter frequencies shown in Table 1.

TABLE 1

| Letter | Frequency (%) | Cumulative Frequency (%) |
|---|---|---|
| E | 13.05 | 13.1 |
| T | 9.02 | 22.1 |
| O | 8.21 | 30.3 |
| A | 7.81 | 38.1 |
| N | 7.28 | 45.4 |
| I | 6.77 | 52.1 |
| R | 6.64 | 58.8 |
| S | 6.46 | 65.2 |
| H | 5.85 | 71.1 |
| D | 4.11 | 75.2 |
| L | 3.6 | 78.8 |
| C | 2.93 | 81.7 |
| F | 2.88 | 84.6 |
| U | 2.77 | 87.4 |
| M | 2.62 | 90 |
| P | 2.15 | 92.2 |
| Y | 1.51 | 93.7 |
| W | 1.49 | 95.2 |
| G | 1.39 | 96.5 |
| B | 1.28 | 97.8 |
| V | 1 | 98.8 |
| K | 0.42 | 99.2 |
| X | 0.3 | 99.5 |
| J | 0.23 | 99.8 |
| Q | 0.14 | 99.9 |
| Z | 0.09 | 100 |

The key sizes S may be a monotonic function of the frequencies of use F. For example, consider the situation in which N=I=M (i.e., in which there is a frequency of use and key size corresponding to each of the N keys). In such a case, the size of each key S(m) may be directly proportional to the corresponding frequency of use F(i), where m=i. In other words, for each value of m, $S(m) = k_1 \cdot F(m) + k_2$, where $k_1$ and $k_2$ are constants.

It should be appreciated, however, that the monotonic function may be a function other than a direct proportion. For example, as shown in Table 1, the frequency of use of certain frequently-used keys (such as "E") may be many times greater than that of certain infrequently-used keys (such as "Z"), in which case making key size directly proportional to key frequency of use would result in an unworkable keyboard layout due to the vast disparity among key sizes. The monotonic function relating frequency of use to key size may, therefore, be any of a variety of functions, such as a logarithmic function. The function may be a step function. For example, it may be desirable to select the number M of key sizes to be relatively small (e.g., 5) in relation to the number of keys N (e.g., 26). In such a case, the N keys may be divided into M subsets, wherein all keys in each subset have the same key size.

The monotonic function relating frequency of use to key size need not be based on a strict mathematical formula; rather, it may be any monotonic function, and each of the M key sizes may be selected in any of a variety of ways. For example, the size and shape of particular keys on the keyboard may need to be designed to accommodate the overall size of the keyboard, to ensure that keys on the keyboard fit closely together, and to accommodate aesthetic considerations such as the organization of keys into linear rows. The particular shape and size of keys, therefore, may be designed on a case-by-case basis in response to the particular application for which the keyboard will be used. Although the size of the keys in a particular case will still be a monotonic function of frequency of use, it should be appreciated based on the considerations described above that key size need not be specified by a particular mathematical formula.

Furthermore, it should be appreciated that the size of particular keys may vary from a strictly monotonic function of frequency of use in particular cases. For example, as described above, space constraints and aesthetic considerations may impact the shape and size of particular keys on the keyboard. It may not be possible, for example, in the design of a particular keyboard, to strictly enforce a monotonic relationship between the size of each key and frequency of use without excessively distorting the QWERTY layout. Business factors may also dictate special treatment of particular keys. As a result, it may be necessary in particular cases for the size of a particular key or keys to be greater or smaller than that dictated by a monotonic relationship between key size and frequency of use. It should be appreciated, however, that there will still be a monotonic relationship between the size of a subset of the N keys and their frequency of use.

Existing keyboards vary the sizes of certain non-alphanumeric keys based on frequency of use. The space bar, for example, which is the most commonly-used key on conventional keyboards, is the largest key on such keyboards. Similarly, the "Shift," "Backspace," and "Enter" keys, which are used frequently, are also typically larger than alphanumeric keys. The alphanumeric keys on such keyboards, however, do not typically vary in size based on their frequency of use.

It should be appreciated that in various embodiments of the present invention, the N keys described above need not comprise all of the keys on the keyboard. For example, there may be a second plurality of keys on the keyboard whose size is not a monotonic function of frequency of use. For example, the N keys may comprise a set of alphanumeric keys on the keyboard or a set of alphabetic keys on the keyboard. In such cases, the remaining keys on the keyboard may or may not have sizes that are a monotonic function of their frequency of use. The subset of N keys may comprise any subset of the keys on the keyboard and may be chosen in any manner.

The frequencies of use F may be selected, generated, predicted, measured, and/or estimated in any of a variety of ways. For example, the frequencies of use F may be actual frequencies of use that are obtained by measuring the frequency with which keys on a conventional computer keyboard are actually used under any of a variety of conditions. For example, the frequencies of use F may be measured while the conventional keyboard is used to type a particular set of texts. The texts may, for example, belong to a category of texts for which the keyboard 100 is to be frequently used. For example, if the keyboard 100 is to be frequently used to type email messages, then the frequencies of use F(i) may be measured while the conventional keyboard is used to type email messages.

Alternatively, the frequencies of use F may be generated by analyzing the frequencies of use of characters in a particular language (e.g., English) or in a particular texts written in such a language. Such generation may be based on an analysis of the frequencies of use of characters within the texts themselves, without recourse to measuring the frequency of key use when typing such texts. Table 1 provides an example of frequencies of use of this kind.

As described above, the number I of frequencies of use may be equal to or less than the number of keys N. If I=N, then each frequency of use F(i) indicates a frequency of use of a particular one of the keys K(n). If, however, I<N, then at least one of the frequencies of use F indicates a frequency of use corresponding to multiple ones of the keys K. A frequency of use that corresponds to multiple keys may be generated in any of a variety of ways. For example, the frequency of use may be calculated as the arithmetic mean of the frequencies of use of the multiple keys to which it corresponds. Such an average frequency of use may then be used, for example to select a common size for each the multiple keys. Any of a variety of functions other than an arithmetic mean may alternatively be used.

The frequencies of use F may correspond to frequencies of use of particular keys or to frequencies of use of particular characters. For example, on conventional keyboards, certain keys (such as the alphabetic keys) are typically each associated with a single character, while other keys (such as the numeric keys) are typically each associated with multiple characters (such as "1" and "!"). A particular frequency of use F(i) may therefore refer either to the frequency of use of a particular character that may be typed using the key, or to the frequency of use of the key itself. For example, the frequency of use of the "1" key may refer either to the frequency of use of the character "1" or to the frequency of use of the "1" key itself (which may be used to type either of the characters "1" or "!"). It should be appreciated, therefore, that the term "frequency of use" as used herein should be understood to encompass both the frequency of use of characters and to the frequency of use of keys.

In the description above, it is stated that the "size" of keys on the keyboard may vary in relation to their frequency of use. As used herein, the term "size" may refer to: (1) the volume of a key, (2) the surface area of a key, or (3) the surface area of the typing surface of a key. The "typing surface of a key" refers to that surface of a key, typically upon which a character is imprinted, that is designed to be touched (e.g., by a user's finger or a stylus) by the user in order to provide input. For example, keys on conventional computer keyboards typically have several sides, including one side which is substantially flat and upon which a character (such as Q, W, E, R, T, or Y) is imprinted. This surface is the "typing surface" of such a key. It should be appreciated that the surface area of the typing surface of a key may be related to the key's frequency of use even if the surface areas of the key's remaining surfaces or the overall volume of the key are not related to the key's frequency of use.

It should further be appreciated that the shape of the keys K may vary in any of a variety of ways. For example, enlargement of certain keys may make it necessary or desirable to alter the shape of one or more keys in order to maintain the overall size and layout of the keyboard. The present invention is not limited to any particular key shape.

Figure 1:
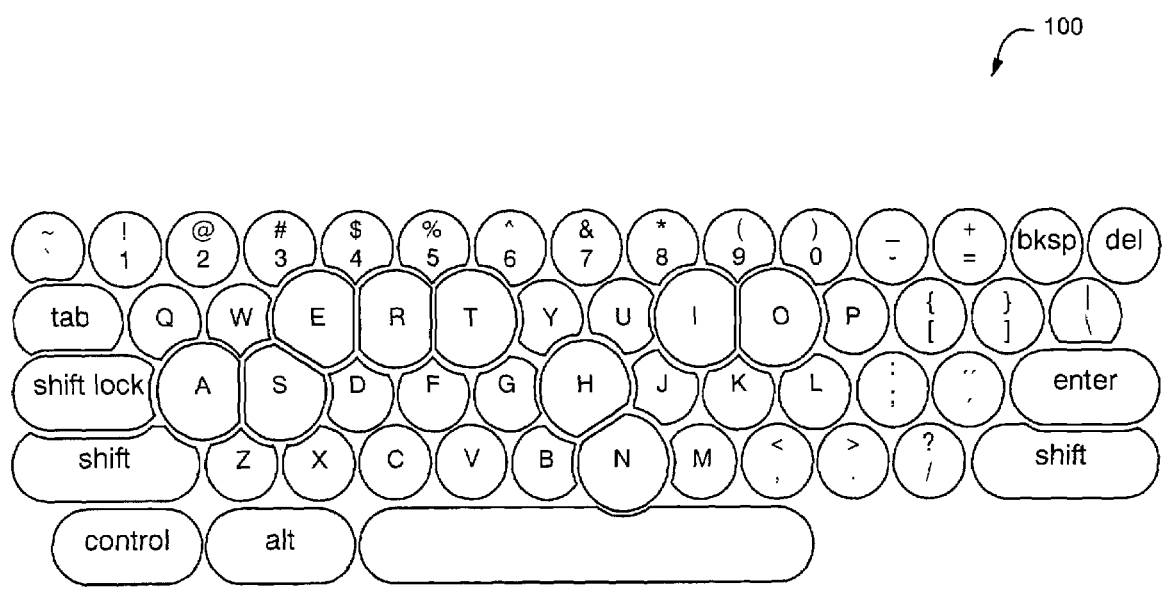
FIG. 1 is a plan view of a keyboard according to one embodiment of the present invention.

Although the keyboard 100 shown in FIG. 1 has a QWERTY layout, and although various other embodiments of the present invention may be described with respect to the QWERTY layout, it should be appreciated that the present invention is not limited to keyboards having a QWERTY layout. Rather, keyboards having other layouts are within the scope of the present invention.

The principles described herein may be applied to any of a variety of keyboards. For example, the keyboard may be a hardware keyboard, such as those typically used to provide input to conventional desktop or laptop computers, or a virtual keyboard such as those displayed on the screens of Personal Digital Assistants (PDAs) and Automatic Teller Machines (ATMs). More specifically, the term "virtual keyboard" as used herein refers to a graphical representation of a keyboard displayed on a computer display that may be used to provide input to a computer. Typically, input is provided through a virtual keyboard by selecting representations of keys on the virtual keyboard using, for example, a finger or a stylus.

Keyboards that may be used in conjunction with various embodiments of the present invention may have any number of keys and may be used to provide input using any character set or language. For example, although the alphabetic keys on the keyboard 100 shown in FIG. 1 may be used to provide input of characters in the Roman alphabet, this does not constitute a limitation of the present invention. Rather, the keyboard 100 may alternatively be used to provide input of characters in any character set. Furthermore, although only the alphanumeric keys of the keyboard 100 shown in FIG. 1 vary in size, this does not constitute a limitation of the present invention. Rather, any subset of the keys on the keyboard 100 may vary in size based on their frequency of use.

Among the advantages of the invention are one or more of the following.

One advantage of various embodiments of the present invention is that making frequently-used keys relatively larger than infrequently-used keys may result in faster typing speed and/or increased typing accuracy. Typing errors often result from a failure to accurately locate one's finger or stylus on the correct key. Increasing the size of keys may increase the probability that the user will be able to accurately locate and depress the correct keys while typing. Increasing the size of all keys, however, might lead to a impractically large keyboard. Making the size of frequently-used keys greater than the size of infrequently-used keys, however, may be used to increase overall typing accuracy (since the frequently-used keys will be accurately typed more often) without increasing overall keyboard size. This may be particularly useful for keyboards that are designed to be used with small portable devices, such as Personal Digital Assistants (PDAs) or wireless email devices.

A further advantage of various embodiments of the present invention is that they are compatible with the conventional QWERTY keyboard layout. As described above, the QWERTY layout has obtained widespread acceptance, and alternatives to the QWERTY layout have failed to achieve any significant success. Increasing the relative size of frequently-used keys in accordance with various embodiments of the present invention provides a means for retaining the advantages of the QWERTY layout—widespread penetration, acceptance, and typing proficiency among a worldwide user base—while decreasing typing error rates associated with the QWERTY layout. Furthermore, making frequently used keys larger is likely to be particularly beneficial to novice users who use the "hunt-and-peck" method of typing and to users who rely on a stylus to type keys, because of the particular susceptibility of users in such cases to inaccurately locate and type the correct keys.

It is to be understood that although the invention has been described above in terms of particular embodiments, the foregoing embodiments are provided as illustrative only, and do not limit or define the scope of the invention. Rather, the scope of the invention is defined by the following claims.

What is claimed is:

1. A physical keyboard comprising a first plurality of N alphabetic keys designated $K(n)$ having a plurality of M sizes designated $S(m)$, wherein $M \geq 3$, wherein the first plurality of keys $K(n)$ are characterized by a plurality of I frequencies of use designated $F(i)$, wherein $S(m)$ is a monotonic function of $F(i)$, and wherein the first plurality of n keys is arranged in a QWERTY layout.

2. The keyboard of claim 1, wherein I is equal to N.

3. The keyboard of claim 1, wherein I is less than N.

4. The keyboard of claim 1, wherein for each value of i, $F(i)$ corresponds to an average frequency of use of a distinct subset of the first plurality of keys $K(n)$.

5. The keyboard of claim 4, wherein the distinct subset of the plurality of keys $K(n)$ comprises a plurality of keys in a single row of keys on the keyboard.

6. The keyboard of claim 1, wherein the keyboard comprises a second plurality of L keys $K(l)$, wherein $N<L$, and wherein $K(n)$ comprises a subset of $K(l)$.

7. A physical keyboard comprising a first plurality of N alphabetic keys designated $K(n)$ corresponding to a plurality of J characters, wherein the first plurality of keys $K(n)$ has a plurality of M sizes designated $S(m)$, wherein $M \geq 3$, wherein the plurality of J characters are characterized by a plurality of I frequencies of use designated $F(i)$, wherein $S(m)$ is a monotonic function of $F(i)$, and wherein the first plurality of N keyes is arranged in a QWERTY layout.

8. The keyboard of claim 7, wherein I is equal to N.

9. The keyboard of claim 7, wherein I is less than N.

10. The keyboard of claim 7, wherein for each value of i, $F(i)$ corresponds to an average frequency of use of a distinct subset of the plurality of characters.

11. The keyboard of claim 10, wherein the distinct subset of the plurality of characters comprises a plurality of characters corresponding to a plurality of keys in a single row of keys on the keyboard.

12. The keyboard of claim 7, wherein the keyboard comprises a second plurality of L keys $K(l)$, wherein $N<L$, and wherein $K(n)$ comprises a subset of $K(l)$.

13. A physical keyboard comprising a plurality of N alphabetic keys designated $K(n)$ corresponding to a plurality of J characters, wherein the plurality of keys $K(n)$ has a plurality of M sizes designated $S(m)$, wherein $M \geq 3$, wherein the plurality of J characters are characterized by a plurality of N frequencies of use designated $F(n)$, and wherein $S(m)$ is a monotonic function of $F(n)$, and wherein the plurality of keys $K(n)$ are arranged in a QWERTY layout.

* * * * *